(12) United States Patent
Roy et al.

(10) Patent No.: US 10,372,470 B2
(45) Date of Patent: Aug. 6, 2019

(54) COPY OF MEMORY INFORMATION FROM A GUEST TRANSMIT DESCRIPTOR FROM A FREE POOL AND ASSIGNED AN INTERMEDIATE STATE TO A TRACKING DATA STRUCTURE

(71) Applicant: HEWLETT PACKARD ENTERPRISE DEVELOPMENT LP, Houston, TX (US)

(72) Inventors: Sourav Roy, Bangalore (IN); Sathish Kumar Raju, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/648,073

(22) Filed: Jul. 12, 2017

(65) Prior Publication Data

US 2018/0032359 A1 Feb. 1, 2018

(30) Foreign Application Priority Data

Jul. 27, 2016 (IN) .............................. 201641025768

(51) Int. Cl.
| | | |
|---|---|---|
| *G06F 13/00* | (2006.01) | |
| *G06F 9/455* | (2018.01) | |
| *G06F 3/06* | (2006.01) | |
| *G06F 12/10* | (2016.01) | |
| *G06F 16/22* | (2019.01) | |

(52) U.S. Cl.
CPC ........ *G06F 9/45533* (2013.01); *G06F 3/0628* (2013.01); *G06F 3/0638* (2013.01); *G06F 3/0668* (2013.01); *G06F 9/45558* (2013.01); *G06F 12/10* (2013.01); *G06F 16/2228* (2019.01); *G06F 2009/45579* (2013.01)

(58) Field of Classification Search
CPC .. G06F 9/45533; G06F 12/10; G06F 9/45558; G06F 3/0668; G06F 17/30321; G06F 3/0638; G06F 3/0628
USPC ....................... 711/170, 154, 162; 718/1, 104
See application file for complete search history.

(56) References Cited

U.S. PATENT DOCUMENTS

| | | |
|---|---|---|
| 6,016,513 A | 1/2000 | Lowe |
| 6,085,217 A | 7/2000 | Ault et al. |
| 6,526,446 B1 | 2/2003 | Yang et al. |
| 6,567,859 B1 | 5/2003 | Yang et al. |
| 6,591,310 B1 | 7/2003 | Johnson |
| 6,981,074 B2 | 12/2005 | Oner et al. |
| 7,200,695 B2 | 4/2007 | Rosner |
| 7,353,360 B1 | 4/2008 | Muller et al. |

(Continued)

OTHER PUBLICATIONS

Allan Cruse, "Our 'xmit1000.c' driver," 2007, pp. 1-23, Available at: <cs.usfca.edu/~cruse/cs635/lesson24.ppt>.

(Continued)

*Primary Examiner* — Hong C Kim
(74) *Attorney, Agent, or Firm* — Hewlett Packard Enterprise Patent Department (57) ABSTRACT

Examples include the copy of memory information from a transmit descriptor to a tracking data structure. Some examples include the memory information being copied from a guest transmit descriptor to a tracking data structure of the guest OS and assignment of the guest transmit descriptor back to a free pool, in response to a determination that the guest transmit descriptor is assigned to an intermediate state.

15 Claims, 4 Drawing Sheets

(56) References Cited

U.S. PATENT DOCUMENTS

| | | | |
|---|---|---|---|
| 7,440,469 | B2 | 10/2008 | Oner |
| 8,006,016 | B2 | 8/2011 | Muller et al. |
| 8,150,996 | B2 | 4/2012 | Haagens et al. |
| 8,194,670 | B2 | 6/2012 | Tripathi et al. |
| 8,631,086 | B2 | 1/2014 | Blocksome et al. |
| 8,724,657 | B2 | 5/2014 | Kuila et al. |
| 8,874,803 | B2 | 10/2014 | Thakkar |
| 8,881,141 | B2 | 11/2014 | Koch et al. |
| 9,019,978 | B2 | 4/2015 | Galles et al. |
| 9,055,104 | B2 | 6/2015 | Philbrick et al. |
| 9,436,596 | B2 | 9/2016 | Sengupta et al. |
| 2011/0078488 | A1* | 3/2011 | Hegde ............... G06F 9/45533 714/3 |
| 2011/0225278 | A1 | 9/2011 | Monchiero et al. |
| 2014/0007097 | A1* | 1/2014 | Chin ............... G06F 9/45533 718/1 |
| 2014/0089347 | A1 | 3/2014 | Thelen |
| 2016/0011996 | A1* | 1/2016 | Asaad ............... G06F 15/76 710/308 |

OTHER PUBLICATIONS

BCM-SPECS, "802.11 / DMA," Apr. 3, 2010, <http://bcm-v4.sipsolutions.net/802.11/DMA>.

Check Point Software Technologies Ltd., "What is the Ring Descriptor Size and under what circumstances should it be increased on IPSO OS," Apr. 28, 2014, pp. 1-4.

Dan Siemon, "Queueing in the Linux Network Stack," Sep. 23, 2013, pp. 1-17, Available at <linuxjournal.com/content/queueing-linux-network-stack>.

Erich Nahum, "Device Layer and Device Drivers," COMS W6998, Spring 2010, pp. 1-20 Available at: <cs.columbia.edu/~nahum/w6998lectures/device-layer.ppt>.

Hewlett Packard Enterprise Development LP, "HP-UX Integrity Virtual Machines—Guest Losses AVIO Network Connectivity After Lan Monitor Failover," Jul. 5, 2016, pp. 1-2.

Hewlett Packard Enterprise Development LP, "HP-UX vPars and Integrity VM v6.4 Administrator Guide," Mar. 2016, pp. 1-290, Edition: 2.0.

Hewlett-Packard Development Company, L.P., "HP Integrity VM Accelerated Virtual I/O (AVIO) Overview," Technical Introduction, Oct. 2008, pp. 1-20.

Hyeongyeop Kim, "Understanding TCP/IP Network Stack & Writing Network Apps," Mar. 2013, <http://www.cubrid.org/blog/dev-platform/understanding-tcp-ip-network-stack/>.

Jen-Cheng Huang et al., "Ally: OS-Transparent Packet Inspection Using Sequestered Cores," WIOV '10, Mar. 13, 2010, pp. 1-8.

Net Silicon, "Ethernet Driver Changes," May 4, 2016, <ftp://ftp1.digi.com/support/training/5.1/Ethernet%20Driver%205.1.ppt>.

QNX Software Systems Limited, "Fine-Tuning Your Network Drivers," 2015, pp. 1-3, Available at: <qnx.com/developers/docs/6.4.1/neutrino/technotes/finetune_net.html>.

Tom Lyczko et al., "What is 'Number of Transmit Descriptors'??," May 16, 2008, pp. 1-2.

Wikipedia, "Register Renaming," Apr. 16, 2016, pp. 1-8, Available at: <en.wikipedia.org/w/index.php?title=Register_renaming&oldid=715615540>.

Wikipedia, "Re-order buffer," Nov. 6, 2015, <https://en.wikipedia.org/w/index.php?title=Re-order_buffer&oldid=689330037>.

Wikipedia, "TCP Offload Engine," Apr. 30, 2016, pp. 1-5, Available at: <en.wikipedia.org/w/index.php?title=TCP_offload_engine&oldid=717970156>.

* cited by examiner

COPY OF MEMORY INFORMATION FROM A GUEST TRANSMIT DESCRIPTOR FROM A FREE POOL AND ASSIGNED AN INTERMEDIATE STATE TO A TRACKING DATA STRUCTURE

BACKGROUND

A host computing device (e.g., a server, etc.) may virtualize some or all of its hardware resources to provide an environment in which a virtual machine (VM) may execute. For example, a VM may execute on the host computing device under the management of a hypervisor that virtualizes underlying physical hardware resources of the host computing device. Such a VM may execute a guest operating system (OS) on the host, and the guest OS may send and receive communications via one or more computer networks.

BRIEF DESCRIPTION OF THE DRAWINGS

The following detailed description references the drawings, wherein.

DETAILED DESCRIPTION

A guest operating system (OS) may run on a virtual machine (VM) managed by a hypervisor executing on a host computing device. The guest OS may utilize a guest OS virtual network driver to transmit data, via the hypervisor, to another computing device remote from the host computing device using a network interface (e.g., a network interface card (NIC)) of the host computing device. In such examples, the network interface may transmit the data to the remote computing device via a computer network such as, for example, a local area network (LAN), a virtual LAN (VLAN), a wireless local area network (WLAN), a virtual private network (VPN), the Internet, or the like, or a combination thereof. The guest OS may also utilize the guest OS virtual network driver to transmit data, via the hypervisor, to another guest OS of the host computing device or to the host computing device itself. In such examples, the guest OS network driver may have available a limited number of guest transmit descriptors for use in managing the transmission of data from the guest OS virtual network driver. In some examples, a transmit descriptor assigned to a free pool of the transmit descriptors may be available for use for a new transmission of data, while a transmit descriptor assigned to a busy state is not available for use for a new transmission.

In some examples, when the guest OS virtual network driver is to transmit data, it may allocate one or more transmit descriptors for the transmission (e.g., depending on the total amount of data to be transferred), associate respective portion(s) of the data with respective ones of the allocated transmit descriptor(s), and assign the busy state to the allocated transmit descriptor(s). Once the guest transmit descriptor(s) are allocated, the hypervisor may be notified of the transmit descriptor(s) so that the hypervisor may begin transferring the data based on the transmit descriptor(s). In some examples, a transmit descriptor may not be assigned from a busy state back into the free pool until a transmit complete notification is received indicating that the data associated with that transmit descriptor has been transmitted to the receiving end-point (e.g., remote computing device, local host, other guest OS, etc.).

In such examples, different latencies may be involved with transmitting to different end-points. For example, the latency between allocating guest transmit descriptors and receiving corresponding transmit complete notification(s) may be much greater for a transmission of data to a remote computing device via a physical NIC than for a transmission of data to the local host computing device running the guest OS or to another guest OS on the local host computing device. In such examples, due to the limited number of available guest transmit descriptors, resource starvation may occur when, for example, a large number of the guest transmit descriptors are held in a busy state pending completion of data transmissions to remote computing device(s) via a physical NIC. In such cases, data transmissions to the local host computing device or another guest OS, which do not involve the physical NIC, may be dropped or delayed due to a lack of available guest transmit descriptors.

To address these issues, examples described herein may utilize an intermediate state for guest transmit descriptors to enable a guest transmit descriptor to be freed for re-use prior to receiving a transmit complete notification associated with a prior transmission using the guest transmit descriptor. In some examples, the guest OS virtual network driver may allocate a guest transmit descriptor for use in transmission of data (including setting it to a busy state) and notify the hypervisor of the guest transmit descriptor allocated for use. Based on the notification, the hypervisor may, in some examples, provide the data to an appropriate driver for transmission and then set the guest transmit descriptor to an intermediate state (different than the busy state).

In some examples, after the notification, the guest OS virtual network driver may determine that the guest transmit descriptor is set to the intermediate state an, in response, may copy memory information stored in the guest transmit descriptor to a tracking data structure of the guest OS and reassign the guest transmit descriptor to the free pool. Subsequently, in response to an indication that a transmit complete notification was provided for the data, the guest OS virtual network driver may then deallocate the memory information copied from the transmit descriptor to the tracking data structure (including memory storing the data for transmission).

In this manner, examples described herein may free transmit descriptors for re-use prior to receipt of a transmit complete notification for transmission of the data previously associated with the transmit descriptor. In this manner, examples described herein may alleviate some of the bottleneck conditions that may otherwise occur when transmit descriptors are held in a busy state pending receipt of transmit complete notifications for data transmissions via a physical NIC. As described herein, examples may take information that may be used by the hypervisor and copy it out of transmit descriptors and into a tracking data structure, thereby separating this information from the transmit descriptors may be returned to a free pool for re-use independent of latencies or delays associated with a physical NIC. For example, examples described herein may prevent transmit descriptors from being held in a busy state because of delays caused by a faulty NIC, or delays imposed by a quality of service (QoS) process or any other process that may temporarily delay transmission of data and/or receipt of notifications associated with transmitting data on a physical NIC. In examples described herein, transmissions using a physical NIC may not delay other types of transmissions not using the NIC (e.g., transmissions to the host or another guest OS), as the transmit descriptors associated with the NIC transmissions may be returned to a free pool for re-use independent of delays associated with use of the NIC, as described above. Also, in examples in which the transmit descriptors are part of a circular data structure that is utilized in order, a busy transmit descriptor (e.g., delayed by a NIC transmission) may prevent later free transmit descriptors from being used. However, this problem may be avoided in examples described herein, as information may be copied out of the transmit descriptor, and the transmit descriptor reused, without waiting for the NIC transmission to be completed. At least for reasons described herein, transmit descriptor management may be more efficient in examples described herein.

Figure 1:
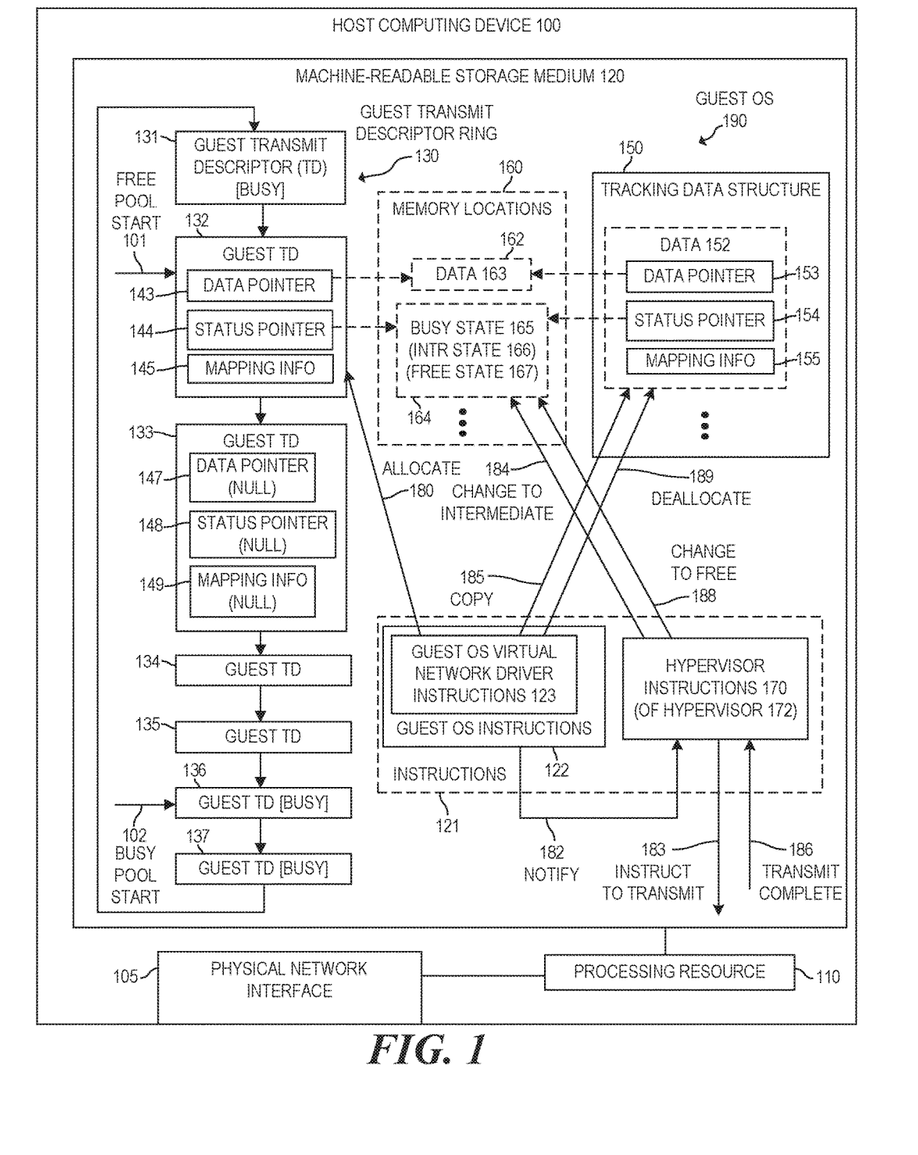
FIG. 1 is a block diagram of an example host computing device to copy memory information from a guest transmit descriptor to a tracking data structure.

Referring now to the drawings, FIG. 1 is a block diagram of an example host computing device 100 to copy memory information from a guest transmit descriptor to a tracking data structure. In the example of FIG. 1, host computing device 100 may be a computing device including a physical network interface 105, at least one processing resource 110, and at least one machine-readable storage medium 120 comprising (e.g., encoded with) instructions 121 that are executable by the at least one processing resource 110 of host computing device 100 to implement functionalities described herein in relation to FIG. 1.

In the example of FIG. 1, instructions 121 may include guest OS instructions 122 that, when executed, implement a guest OS 190 on host computing device 100. Guest OS 190 may include, in part, a guest transmit descriptor ring 130 and a tracking data structure 150, and may utilize memory locations 160 of host computing device 100. Instructions 121 may also include hypervisor instructions 170 that, when executed, implement a hypervisor 172 on host computing device 100. In the example of FIG. 1, hypervisor 172 may manage execution of guest OS 190 on host computing device 100.

Guest OS instructions 122 may include guest OS virtual network driver instructions 123 that, when executed, may implement a virtual network driver for guest OS 190. In some examples, the guest OS virtual network driver implemented by instructions 123 may perform data transmission functionalities for guest OS 190, including facilitating, via hypervisor 172, data communication with host computing device 100, with other guest operating system(s) on host computing device 100, and with remote computing device(s) that are remote from host computing device via at least one computer network, for example. In some examples, the guest OS virtual network driver implemented by instructions 123 may communicate data with remote computing device(s) via hypervisor 172 and physical network interface 105 of host computing device 100. In examples described herein, a physical network interface may be a physical hardware device to perform data communication via at least one computer network. A network interface card (NIC) is an examples of a physical network interface.

In the example of FIG. 1, guest OS virtual network driver instructions 123 may utilize the guest transmit descriptor ring 130 of guest OS 190 for data transmission. In examples described herein, a "transmit descriptor" may be a data structure to store information related to data for transmission to a destination via an actual or virtual network driver and to facilitate transmission of that data to the destination via the network driver. In examples described herein, a "network driver" may be a driver for a physical network interface (which may be referred to as an "actual" network driver herein) or a "virtual" driver for a virtual network interface (or virtual NIC) rather than a physical network interface (or physical NIC).

In examples described herein, transmit descriptors may be maintained in a transmit descriptor ring. In examples described herein, a "transmit descriptor ring" may be a data structure to maintain a predetermined and fixed number of transmit descriptors in an ordered, circular list. In such examples, the transmit descriptors in a transmit descriptor ring are strictly ordered such that each transmit descriptor is defined to have or point to exactly one next transmit descriptor in the list (i.e., a "next" transmit descriptor), and no two transmit descriptors share or point to the same next transmit descriptor. Each transmit descriptor in such a transmit descriptor ring is also pointed to by exactly one transmit descriptor in the list (i.e., a "previous" transmit descriptor), and no two transmit descriptors share or are pointed to by the same previous transmit descriptor. In such examples, the list of transmit descriptors is circular. For example, the list is circular in that each transmit descriptor, from a first transmit descriptor to a last transmit descriptor of the list, points to a next transmit descriptor in the list, and the last transmit descriptor in the list points to the first transmit descriptor in the list as its "next" transmit descriptor. In examples described herein, transmit descriptors of a transmit descriptor ring may be utilized according to the defined order and circular organization of the list of transmit descriptors forming the transmit descriptor ring. In examples described herein, a transmit descriptor ring may be implemented by a linked list data structure, in which transmit descriptors are the elements of the linked list, and the linked list is circular (as described above), or may be implemented in any other suitable manner.

In the example of FIG. 1, guest transmit descriptor ring 130 may include a plurality of guest transmit descriptors 131-137. In the example of FIG. 1, each of guest transmit descriptors 131-137 is one of the fixed number of guest transmit descriptors of guest OS 190 and that are maintained in guest transmit descriptor ring 190 (e.g., a circular list data structure of guest OS 190). In some examples, guest transmit descriptor ring 130 may include more or fewer guest transmit descriptors. In some examples, guest transmit descriptor ring 130 may include any suitable fixed number of guest transmit descriptors, where the number is "fixed" throughout the operation of guest OS 190 and the guest OS virtual network driver implemented by instructions 123 such that no guest transmit descriptors may be added to or removed from guest transmit descriptor ring 130.

In examples described herein, guest transmit descriptor ring 130 may include a free pool of transmit descriptors that are available for use for a new transmission of data, and a busy pool of transmit descriptors that are currently in use for a data transmission or that have yet to be returned to the free pool. In the example of FIG. 1, a free pool start pointer 101 points to the start of the free pool of guest transmit descriptor ring 130, and a busy pool start pointer 102 points to the start of the busy pool of guest transmit descriptor ring 130. In the example of FIG. 1, the free pool of guest transmit descriptor ring 130 is the group of transmit descriptors including all the transmit descriptors from the transmit descriptor pointed to by the free pool start pointer 101 to the transmit descriptor just before the transmit descriptor pointed to by the busy pool start pointer 102 (i.e., in the order of transmit descriptors defined by the "next" pointers of the transmit descriptors as described above). In the example of FIG. 1, the free pool may include transmit descriptors 132-135, when pointer 101 points to guest transmit descriptor 132 and pointer 102 points to guest transmit descriptor 136.

In the example of FIG. 1, the busy pool of guest transmit descriptor ring 130 is the group of transmit descriptors including all the transmit descriptors from the transmit descriptor pointed to by the busy pool start pointer 102 to the transmit descriptor just before the transmit descriptor pointed to by the free pool start pointer 101 (i.e., in the order of transmit descriptors defined by the "next" pointers of the transmit descriptors as described above). In the example of FIG. 1, the busy pool may include transmit descriptors 136, 137, and 131 when pointer 102 points to guest transmit descriptor 136 and pointer 101 points to guest transmit descriptor 132. In the example of FIG. 1, each of guest transmit descriptors 136, 137, and 131 may be assigned a busy state (e.g., assigned as described herein in relation to transmit descriptor 132).

In examples described herein, a guest transmit descriptor may be capable of storing multiple types of memory information, including first memory information referencing a first memory location of host computing device 100 at which data to be transmitted is stored, and second memory information referencing a second memory location of host computing device 100 storing status information related to the transmission of the data. In some examples described herein, memory information referencing memory locations may be implemented by pointers, although any other suitable type of memory information may be used in other examples. For example, the first memory information may be a pointer to a memory location to store the data to be transmitted, and the second information may be a pointer to a memory location (in memory of host computing device 100) to store status information associated with the guest transmit descriptor.

In some examples, the status information associated with a guest transmit descriptor may indicate a state of the transmit descriptor. In some examples, a guest transmit descriptor may be assigned a "busy" state or a "free" state. A guest transmit descriptor may have a "busy" state when it is currently in use for a transmission of data. A guest transmit descriptor may not be selected for transmission of new data while it is assigned the busy state. In some examples, a guest transmit descriptor may be assigned a "free" state when it is no longer in use for a prior transmission of data (e.g., after previously having a busy state). Examples described herein also introduce an "intermediate" state that is described in more detail below.

In examples described herein, a guest transmit descriptor may also include memory mapping information that components of host computing device 100 may utilize to access the memory locations pointed to by the pointers stored in the guest transmit descriptor. For example, pointers of a guest transmit descriptor may utilize a mapping of virtual to physical memory of host computing device 100 that is specific to the guest OS 190, other components of host computing device 100 (e.g., hypervisor 172) may use a different mapping of virtual memory locations to the physical memory locations of host computing device 100. In such examples, the other components of host computing device 100 (e.g., hypervisor 172) may utilize the memory mapping information to access the correct memory locations of host computing device 100 pointed to by the pointers of the guest transmit descriptor.

In the example of FIG. 1, for guest transmit descriptors in the free pool of guest transmit descriptor ring 130, the pointers (e.g., memory information) and the memory mapping information for those guest transmit descriptors may be null, since those guest transmit descriptors are not currently in use for data transmission. As an example, data pointer 147, status pointer 148, and memory mapping information 149 are all null for guest transmit descriptor 133 of the free pool in the example of FIG. 1.

In some examples, guest transmit descriptor 132 may also have null data and status pointers 143 and 144, and null memory mapping information 145 while it is in the free pool and unallocated for use in a data transmission. In this state, guest transmit descriptor 132 may be at the start of the free pool, as illustrated in FIG. 1. For explanatory purposes, examples are described below involving a data transmission requested while guest transmit descriptor 132 is at the start of the free pool, as illustrated in FIG. 1, and while having null pointers 143 and 144, and null memory mapping information 145.

In such examples, instructions 123 implementing a guest OS virtual network driver may receive a request to transmit specified data to a given destination. For example, guest OS 190 (or a component thereof) may provide the request to instructions 123 in order to transmit data outside of guest OS 190 via the guest OS virtual network driver. In such examples, this request may indicate to instructions 123 that the specified data is to be transmitted via the guest OS virtual network driver.

In response to the indication, instructions 123 may allocate 180 the guest transmit descriptor 132 from the free pool of guest transmit descriptors of the guest transmit descriptor ring 130, for transmission of the specified data. In examples described herein, the allocation or use of a transmit descriptor "for" transmission of data means that the transmit descriptor is used in the overall process of transmission of the data (e.g., to at least in part facilitate the transmission of the data), not that the transmit descriptor itself is transmitted to the destination, or that the data is transmitted in the transmit descriptor itself. In some examples, the allocation may include assigning a busy state 165 to guest transmit descriptor 132 and associating the specified data with the given guest transmit descriptor. For example, in response to the indication, instructions 123 may identify guest transmit descriptor 132 from the start of the free pool of guest transmit descriptor ring 130, and store memory information in the given guest transmit descriptor.

In the example of FIG. 1, in response to the indication, instructions 123 may identify guest transmit descriptor 132 at the start of the free pool and select it for use. In such examples, after identifying guest transmit descriptor 132 for use, instructions 123 may store memory information in the given guest transmit descriptor, including a data pointer 143 pointing to a memory location 162 (of host computing device 100) storing the specified data 163 to be transmitted based on the request, and a data pointer 144 pointing to a memory location 164 (of host computing device 100) to store status information, including any state assigned to guest transmit descriptor 132. In the example of FIG. 1, instructions 123 may store an indication of a busy state 165 in memory location 164, and store a status pointer 144 to memory location 164 in guest transmit descriptor 132, during the allocation of guest transmit descriptor 132. In other examples, data pointer 143 may be any suitable memory information 143 referencing memory location 162 and status pointer 144 may be any suitable memory information 144 referencing memory location 164. In some examples, the data pointed to by the data pointer 143 may be all of the data to be transmitted in response to the request, or may be less than all of the data (i.e., a portion of the data), wherein other guest transmit descriptors may be allocated for the transmission of the other portion(s) of the data. Based on the selection of guest transmit descriptor 132, the free pool start pointer 101 may be advanced to a later guest transmit descriptor in the guest transmit descriptor ring 130 (e.g., the next guest transmit descriptor that remains free after allocating guest transmit descriptor(s) in response to the request). In such examples, guest transmit descriptor 132 may then be at the end of the busy pool. In the example of FIG. 1, instructions 123 may further store appropriate memory mapping information 145 as described above (e.g., parameters for an appropriate memory mapping function to be used by hypervisor 172 to access the appropriate memory locations 162 and 164 pointed to by the data and status pointers 143 and 144, respectively.

After allocation of guest transmit descriptor 132, as described above, instructions 123 may notify 182 the hypervisor 172 of allocated guest transmit descriptor 132. For example, instructions 123 may call a function of hypervisor 172 to provide hypervisor 172 with pointers to the start and end of a series or chain of guest transmit descriptors of the guest transmit descriptor ring 130 that have been allocated for transmission of a given collection of data (e.g., including the specified data), including at least guest transmit descriptor 132. The function call may indicate to the hypervisor that the data associated with the indicated guest transmit descriptors (including guest transmit descriptor 132), is to be transmitted via hypervisor 172. In response to the function call, hypervisor instructions 170 may create local copies of the chain of guest transmit descriptors, including a local copy of the guest transmit descriptor 132, in the kernel memory space of host computing device 100.

Also in response to the notification (e.g., the function call), and based on at least guest transmit descriptor 132 of the guest OS that is assigned a busy state 165 and associated with data 163 for transmission, hypervisor instructions 170 may instruct 183 host computing device 100 to transmit the data 163 via physical network interface 105. For example, instructions 170 may instruct 183 the host computing device 100 to transmit the data 163 by calling a driver for physical network interface 105 to instruct physical network interface 105 to provide data 163 (and any other data specified by other guest transmit descriptors that the hypervisor 172 was notified of with guest transmit descriptor 132) to a destination specified in the original request received by instructions 123 to transmit the data. In some examples, instructions 170 may determine to provide the data to the driver for the physical network interface 105 based on the destination address (e.g., a determination that the destination address is for a remote computing device). In some examples, instructing the driver of physical network interface 105 to transmit the specified data 163 may be referred to as "posting" the data to the physical network interface.

In such examples, after instructing 183 the host computing device 100, as described above, and before receiving a transmit complete notification for the data 163 (indicating that the data transmission via the physical network interface 105 is complete), instructions 170 may change 184 the state of the guest transmit descriptor 132 to an intermediate state 166. In such examples, instructions 170 may write information indicating the intermediate state 166 to memory location 164. In examples described herein, an "intermediate" state of a guest transmit descriptor of a guest OS managed by a hypervisor may indicate that the data associated with the guest transmit descriptor has been provided downstream of the guest OS and hypervisor (e.g., posted to a network interface, as described above), but that no transmit complete notification has been received and processed by the hypervisor for that data. In some examples, the local copy of guest transmit descriptor 132 that belongs to hypervisor 172 may include a pointer to the status information stored at memory location 164. In such examples, instructions 170 may use that pointer to write the intermediate state 166 directly to memory location 164 also pointed to by status pointer 144 of guest transmit descriptor 132.

In the example of FIG. 1, instructions 123 may periodically inspect at least some of the fixed number of guest transmit descriptors of the guest transmit descriptor ring 130 to identify any of the guest transmit descriptors that have been assigned to an intermediate state. In some examples, instructions 123 may utilize a timer or any other suitable technique to, at periodic intervals, trigger the inspection of the states of some or all of the guest transmit descriptors of guest transmit descriptor ring 130. For example, in response to the guest transmit descriptor state inspection being triggered (e.g., in response to a timer or other periodic indication), instructions 123 may inspect each of the guest transmit descriptors of the busy pool, including guest transmit descriptor 132 (which was moved to the busy pool when allocated), to determine at least whether any of the guest transmit descriptors of the busy pool have been assigned to the intermediate state. In such examples, instructions 123 may determine that guest transmit descriptor 132 is assigned to intermediate state 166 (e.g., by inspecting the information in the memory location 164 pointed to by status pointer 144 of guest transmit descriptor 132).

In response to a determination that guest transmit descriptor 132 is assigned the intermediate state 166 (and prior to any indication that a transmit complete notification was provided for the data 163), instructions 123 may copy 185 memory information from guest transmit descriptor 132 to a tracking data structure 150 of guest OS 190 that is separate from guest transmit descriptor ring 130. For example, memory information including data pointer 143 and status pointer 144 may be copied to tracking data structure 150 as copied data pointer 153 and copied status pointer 154, as shown in FIG. 1. In such examples, the copied data pointer 153 may point to memory location 162 containing data 163 (like data pointer 143), and the copied status pointer 154 may point to memory location 164 indicating intermediate state 166 (like status pointer 144). Instructions 123 may also copy the mapping information 145 from guest transmit descriptor 132 to tracking data structure 150 as copied mapping information 155 that is the same as mapping information 145. The copied information 153, 154, and 155 may be associated in tracking data structure 150 and referred to herein as associated data 152. Tracking data structure 150 may be implemented by suitable data structure.

Also in response to the determination that guest transmit descriptor 132 is assigned the intermediate state 166 (and prior to any indication that a transmit complete notification was provided for the data 163), instructions 123 may assign (e.g., re-assign) guest transmit descriptor 132 to the free pool of the guest transmit descriptor ring 130 of guest OS 190. In some examples, assigning guest transmit descriptor 132 to the free pool may include moving the free pool start pointer 101 to point to guest transmit descriptor 132 (or to another guest transmit descriptor before guest transmit descriptor 132 in guest transmit descriptor ring 130). In some examples, assigning guest transmit descriptor 132 to the free pool may also include clearing each of data pointer 143, status pointer 144, and memory mapping information 145 in any suitable manner (or otherwise re-initializing those fields). For example, instructions 123 may set each of data pointer 143, status pointer 144, and mapping info 145 to null (e.g., as shown for corresponding fields of guest transmit descriptor 133). In such examples, while the guest transmit descriptor 132 no longer points to memory locations 162 and 164, the copied data pointer 153 of tracking data structure 150 continues to point to memory location 162 storing data 163, the copied status pointer 154 of tracking data structure 150 continues to point to memory location 164 storing information indicating intermediate state 166, and the copied memory mapping information 155 remains in tracking data structure 150. In this manner, while guest transmit descriptor 132 is returned to the free pool with at least some of its fields re-initialized, tracking data structure continues to maintain the pointers to the data 163 and the status information previously for guest transmit descriptor 132, as well as the memory mapping information previously for guest transmit descriptor 132.

In this manner, examples described herein may make the guest transmit descriptor 132 available for use again prior to any indication that a transmit complete notification has been received by hypervisor 172. Such examples may avoid holding a guest transmit descriptor in a busy state (and thus unavailable for reuse) until an indication is received that the hypervisor 172 has received the transmit complete notification. For example, after the assignment of guest transmit descriptor 132 back to the free pool (after being used for data 163) and prior to any indication that a transmit complete notification has been provided for data 163, instructions 123 may reallocate guest transmit descriptor 132 from the free pool for transmission of other data, different than data 163. In such examples, instructions 123 may reallocate guest transmit descriptor 132 as described above for allocation for data 163, including storing a data pointer to the other data in guest transmit descriptor 132 and assigning a busy state to the guest transmit descriptor 132. For example, the other data may be stored in a memory location (of memory locations 160) that is different than the memory location 162 storing data 163, and instructions 123 may store a pointer to that memory location storing the other data. In some examples, so assign the busy state to the guest transmit descriptor 132 (in relation to transmission of the other data), instructions 123 may store an indication of busy state 165 in a memory location (of memory locations 160) that is different than the memory location 164, and instructions 123 may store a pointer to that memory location storing the busy state indication. In such examples, guest transmit descriptor 132 may be re-used while the data in memory locations 162 and 164, previously pointed to by guest transmit descriptor 132, remain in memory referenced (i.e., pointed to) by data 152 and awaiting an indication of a transmit complete notification. In some examples, data 163 may be data to be transmitted via physical network interface 105 to a remote computing device, as described above, and the other data may be data to be transmitted to a destination local to host computing device 100 (e.g., to another guest OS of host computing device 100 or to host computing device 100 itself) and without use of physical network interface 105. In such examples, examples described herein may reduce the amount of time that a guest transmit descriptor is held in the busy state when allocated for data to be transmitted via a physical network interface, for example. In this manner, examples described herein may make guest transmit descriptors available for reuse more quickly after use for a data transmission via a physical network interface than when the guest transmit descriptor is held in a busy state until an indication that a transmit complete notification has been received. In such examples, there may be less likelihood that guest transmit descriptors held in a busy state for a relatively large amount of time waiting for transmit complete notifications for data transmissions using a physical network interface may prevent local transmission not using a physical network interface (e.g., to the host computing device 100 or another guest OS) due to unavailability of guest transmit descriptors.

In the example of FIG. 1, after hypervisor instructions 170 write the intermediate state 166 to memory location 164 for guest transmit descriptor 132 and after instructions 123 copy memory information of guest transmit descriptor 132 to tracking data structure 150, as described above, hypervisor instructions 170 may receive a transmit complete notification 186 indicating that data 163 has been successfully transmitted. For example, in examples in which data 163 is to be provided to a remote computing device via physical network interface 105, hypervisor instructions 170 may receive the transmit complete notification 186 from physical network interface 105 (or a driver for the physical network interface 105) once the data 163 has been successfully transmitted by the physical network interface 105.

In response to receiving the transmit complete notification 186 for the data 163, hypervisor instructions 170 may set the status information in memory location 164 (i.e., formerly associated with guest transmit descriptor 132) to indicate a free state 167. In such examples, the status information hypervisor instructions 170 set to indicate free state 167 is status information referenced by memory information copied from the guest transmit descriptor 132 to tracking data structure 150. For example, hypervisor instructions 170 may set the status information in memory location 164 to indicate the free state 167, where memory location 164 is pointed to by the copied status pointer 154 (i.e., copied from guest transmit descriptor 132) and formerly pointed to (i.e., referenced by) the status pointer 144 of guest transmit descriptor 132. In some examples, as noted above, the local copy of guest transmit descriptor 132 that belongs to hypervisor 172 may include a pointer to the status information stored at memory location 164. In such examples, instructions 170 may use that pointer of the local copy of the transmit descriptor to write the free state 167 directly to memory location 164 pointed to by copied status pointer 154 of tracking data structure 150.

In the example of FIG. 1, after the assignment of the previously allocated guest transmit descriptor 132 to the free pool, and in response to an indication that a transmit complete notification 186 was provided for the data, instructions 123 may deallocate 188 memory referenced by the memory information copied from guest transmit descriptor 132 to tracking data structure 150. For example, guest transmit descriptor 132 may be returned to the free pool in response to a determination that it is assigned an intermediate status 166, as described above. Also, hypervisor instructions 170 may change the status information of memory location 164 (and previously associated with guest transmit descriptor 132) to indicate the free state 167 in response to receipt of the transmit complete notification, as described above. In such examples, the free state 167 being stored in memory location 164 may serve as an indication that the transmit complete notification 186 for data 163 has been received (i.e., by hypervisor instructions 170). In such examples, instructions 123 may deallocate 188 memory referenced by the memory information of data 152 copied from guest transmit descriptor 132 to tracking data structure 150 in response to detection of the free state 167 being written to memory location 164.

In some examples, instructions 123 may periodically inspect the tracking data structure to identify any status information referenced by the tracking data structure that indicates a free state. In some examples, instructions 123 may utilize a timer or any other suitable technique to trigger the inspection of the tracking data structure at periodic intervals, as described above in relation to periodic inspection of the guest transmit descriptors of guest transmit descriptor ring 130. In some examples, the same timer or other periodic trigger that triggers instructions 123 to inspect the guest transmit descriptors as described above may also trigger instructions 123 to inspect the tracking data structure. In some examples, in response to a tracking data structure inspection being triggered (e.g., in response to a timer or other periodic indication), instructions 123 may inspect memory locations pointed to by status pointers of tracking data structure 150 to determine whether any of the status information in those memory locations indicates a free state. In such examples, after hypervisor instructions 170 have written the free state 167 to memory location 164, instructions 123, during the periodic inspection, may determine that memory location 164, pointed to by copied status pointer 154, indicates the free state 167.

In response to detection of information indicating the free state 167 being stored in memory location 164, instructions 123 may deallocate 188 memory referenced by the memory information copied from guest transmit descriptor 132 to tracking data structure 150. As described above, the memory information copied from guest transmit descriptor 132 to tracking data structure 150 may include copied data pointer 153 and copied status pointer 154. In response to detection of information indicating the free state 167 being stored in memory location 164, instructions 123 may deallocate 188 memory location 162, which is referenced (or pointed to) by copied data pointer 153 and may store the data 163 (i.e., the data for transmission), and may deallocate memory location 164, which is referenced (or pointed to) by copied status pointer 154 and may store an indication of a state (e.g., free state 167). In some examples, response to detection of information indicating the free state 167 being stored in memory location 164, instructions 123 may also deallocate 188 the memory storing the memory mapping information 155 copied from guest transmit descriptor 132 to tracking data structure 150.

In examples described herein, each of memory locations 162 and 164 may be of any suitable size. In some examples, in response to transmit complete notification 186, hypervisor instructions 170 may store additional information (e.g., accounting information) about the transmit process in the memory location 164 in addition to the free state 167 indication. For example, hypervisor instructions 170 may store information about whether the transmit operation was successful or failed, or may set a flag, or a may store any other suitable information to be reported upstream regarding the transmission of data 163. In such examples, instructions 123 may provide the additional information to another component of host computing device 100 (e.g., to guest OS 190, or an application run by guest OS 190) prior to deallocating memory location 164, as described above.

In the example of FIG. 1, instructions 121, guest transmit descriptor ring 130, tracking data structure 150, and memory locations 160 are illustrated as being located on machine-readable storage medium 120. In examples described herein, machine-readable storage medium 120 may be implemented one or multiple different memory devices, as described below. In such examples, instructions 121, guest transmit descriptor ring 130, tracking data structure 150, and memory locations 160 may be located on the same memory device, or distributed across a plurality of different memory device in any suitable manner. In examples described herein, the hypervisor may be a virtual machine monitor (VMM) (i.e., instructions 170 may implement a VMM to perform the functions described herein in relation to instructions 170).

As used herein, a "computing device" may be a desktop or laptop computer, switch, router, server, or any other processing device or equipment including a processing resource. In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. The at least one processing resource 110 may fetch, decode, and execute instructions stored on storage medium 120 to perform the functionalities described above in relation to instructions 121. In other examples, the functionalities of any of the instructions of storage medium 120 may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the example of FIG. 1, storage medium 120 may be implemented by one machine-readable storage medium, or multiple machine-readable storage media.

In other examples, the functionalities described above in relation to instructions 121 may be implemented by one or more engines which may be any combination of hardware and programming to implement the functionalities of the engine(s). In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one of the engine(s). In some examples, the at least one machine-readable storage medium may store instructions that, when executed by the at least one processing resource, at least partially implement some or all of the engine(s). In such examples, host computing device 100 may include the at least one machine-readable storage medium storing the instructions and the at least one processing resource to execute the instructions.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components.

In some examples, instructions 121 may be part of an installation package that, when installed, may be executed by processing resource 110 to implement the functionalities described above. In such examples, storage medium 120 may be a portable medium, such as a CD, DVD, or flash drive, or a memory maintained by a server from which the installation package can be downloaded and installed. In other examples, instructions 121 may be part of an application, applications, or component(s) already installed on host computing device 100 including processing resource 110. In such examples, the storage medium 120 may include memory such as a hard drive, solid state drive, non-volatile memory device, or the like. In some examples, functionalities described herein in relation to FIG. 1 may be provided in combination with functionalities described herein in relation to any of FIGS. 2-4.

Figure 2:
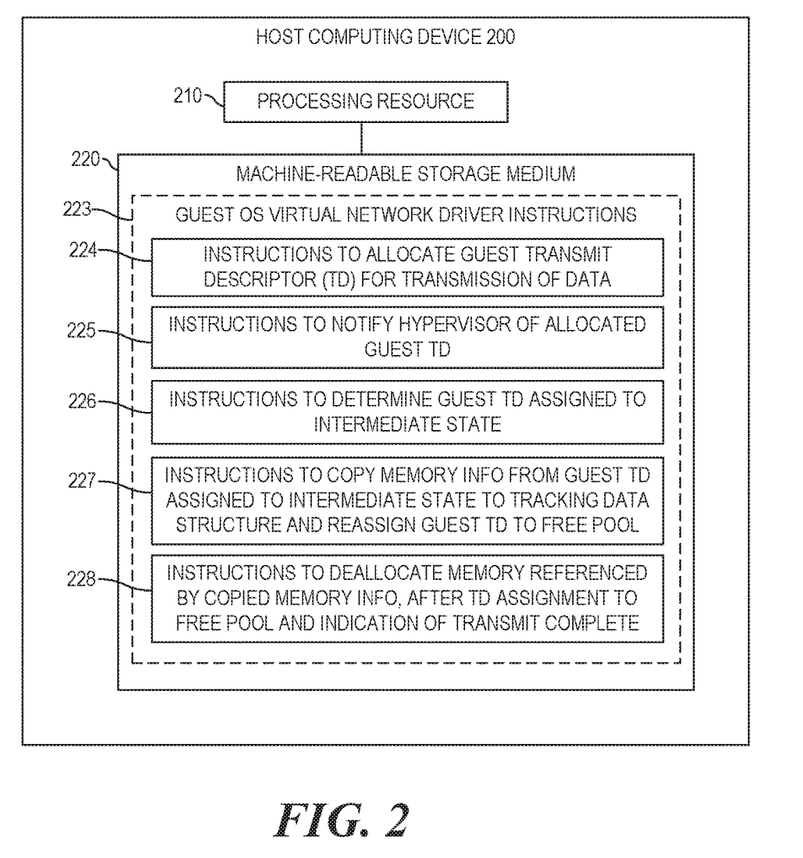
FIG. 2 is a block diagram of an example host computing device including instructions of a guest operating system (OS) virtual network driver executable to copy memory information from a guest transmit descriptor to a tracking data structure.

FIG. 2 is a block diagram of an example host computing device 200 including instructions of a guest OS virtual network driver executable to copy memory information from a guest transmit descriptor to a tracking data structure. In the example of FIG. 2, host computing device 200 may be a computing device including at least one processing resource 210 and at least one machine-readable storage medium 220 comprising (e.g., encoded with) instructions 223 that are executable by the at least one processing resource 210 to implement functionalities described herein in relation to FIG. 2. In some examples, instructions 223 may be executable to implement any of the functionalities described above in relation to instructions 123. In some examples, instructions 123 may be executable to implement any of the functionalities described herein in relation to instructions 223. In some examples, instructions 223 may be guest OS virtual network driver instructions 223 that are executable by processing resource 210 of host computing device 200 to execute a guest OS virtual network driver to perform the functionalities described below in relation to instructions 223. Instructions 223 may include instructions 224-228 to implement the functionalities described below.

In the example of FIG. 2, the guest OS virtual network driver may be a part of a guest OS of host computing device 200 managed by a hypervisor of host computing device 200. In examples described herein, the guest OS includes a fixed number of guest transmit descriptors that are maintained in guest transmit descriptor ring 190, and that may include a busy pool and a free pool of guest transmit descriptors, as described above.

In the example of FIG. 2, instructions 223 may receive an indication that data is to be transmitted via the guest OS virtual network driver implemented by instructions 223 (e.g., as described above in relation to instructions 123). In response to the indication, instructions 224 may allocate, from the free pool, a given guest transmit descriptor of the guest OS for transmission of data by the guest OS virtual network driver (implemented by instructions 223) via the hypervisor associated with the guest OS (i.e., the hypervisor to manage the execution of the guest OS). In some examples, as part of the allocation, instructions 244 may assign a busy state to the guest transmit descriptor.

In some examples, as part of the allocation, instructions 224 identify a given guest transmit descriptor from the free pool of the guest transmit descriptors, and may store memory information (e.g., pointers) in the given guest transmit descriptor, the memory information referencing a first memory location of (host computing device 200) storing the data to be transmitted, and referencing a second memory location storing an indication of the busy state for the given guest transmit descriptor. In the example of FIG. 2, the given guest transmit descriptor that is allocated may be one of the fixed number of guest transmit descriptors of the guest OS that are maintained in a circular list data structure of the guest OS, as described above.

After the allocation, instructions 225 may notify the hypervisor of the given guest transmit descriptor that was allocated, as described above in relation to instructions 123 (e.g., via a function call of the hypervisor). In some examples, the hypervisor may, in response to the notification, provide the data to be transmitted downstream for transmission as described above in relation to FIG. 1. For example, for data to be transmitted to a remote computing device via a physical network interface of host computing device 200, the hypervisor may provide the data to a driver for the physical network interface (e.g., post the data to the network interface). In such examples, the hypervisor may then assign the intermediate state to the given guest transmit descriptor, as described above, after providing the data to the driver of the physical network interface and before receiving any transmit complete notification for the transmission of the data.

In such examples, after notifying the hypervisor of the given guest transmit descriptor allocated for transmission of the data (and after the hypervisor changes the state of the given guest transmit descriptor from the busy state to the intermediate state), instructions 226 may determine that the given guest transmit descriptor is assigned the intermediate state, which is different than the busy state. In such examples, instructions 226 may determine that the given guest transmit descriptor is assigned the intermediate state after the notification of the hypervisor of the given guest transmit descriptor and prior to any indication that a transmit complete notification has been provided for the data to be transmitted.

In response to the determination, instructions 227 may copy memory information stored in the guest transmit descriptor to a tracking data structure of the guest OS (and stored on host computing device 200) and assign the guest transmit descriptor back to the free pool, as described above in relation to instructions 123. In some examples, the memory information copied by instructions 227 from the given guest transmit descriptor to the tracking data structure may include a pointer to a memory location including the data for transmission, and a pointer to a memory location including status information for the given guest transmit descriptor. In some examples, instructions 227 may further copy memory mapping information of the given guest transmit descriptor to the tracking data structure.

After the assignment of the guest transmit descriptor back to the free pool, and in response to an indication that a transmit complete notification was provided for the data, instructions 228 may deallocate memory referenced by the memory information copied from the guest transmit descriptor to the tracking data structure, including memory storing the data for transmission. In examples described herein, the indication that the transmit complete notification was provided for the data may be an indication of a free state in a memory location pointed to by the data copied out of the given guest transmit descriptor and into the tracking data structure, as described above in relation to instructions 123. In some examples, instructions 228 may detect the indication and deallocate the memory referenced by the memory information copied from the guest transmit descriptor to the tracking data structure, as described above in relation to instructions 123. In some examples, instructions 228 may deallocate the memory locations storing the data for transmission and the status information previously associated with the given guest transmit descriptor, where these memory locations are referenced (i.e., pointed to) by pointers copied from the given guest transmit descriptor to the tracking data structure. In some examples, instructions 228 may also deallocate memory including the memory mapping information copied from the given guest transmit descriptor to the tracking data structure.

In some examples, after the assignment of the given guest transmit descriptor back to the free pool, and prior to any indication that a transmit complete notification has been provided for the data for transmission, instructions 224 may reallocate the given guest transmit descriptor, from the free pool, for transmission of other data. In such examples, instructions 224 may assign the busy state to the given guest transmit descriptor as part of the reallocation. In such examples, the first allocation of the given guest transmit descriptor may be for transmission of data to a remote computing device via a physical network interface (the remote computing device remote being remote from host computing device 200), and the second allocation of the given guest transmit descriptor may be for other data to be transmitted to a destination local to the host computing device (e.g., to another guest OS of host computing device 200 or to host computing device 200 itself) and without use of a physical network interface of host computing device 200. In some examples, the at least one processing resource 210 to execute guest OS virtual network driver instructions 223 may also execute the guest OS and the hypervisor to manage the guest OS.

In the example of FIG. 2, the at least one processing resource 210 may fetch, decode, and execute instructions stored on storage medium 220 to perform the functionalities described above in relation to instructions 223. In other examples, the functionalities of any of the instructions of storage medium 220 may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the example of FIG. 2, storage medium 220 may be implemented by one machine-readable storage medium, or multiple machine-readable storage media. In other examples, the functionalities described above in relation to instructions 223 may be implemented by one or more engines which may be any combination of hardware and programming to implement the functionalities of the engine(s), as described above. In some examples, functionalities described herein in relation to FIG. 2 may be provided in combination with functionalities described herein in relation to any of FIGS. 1, 3, and 4.

Figure 3:
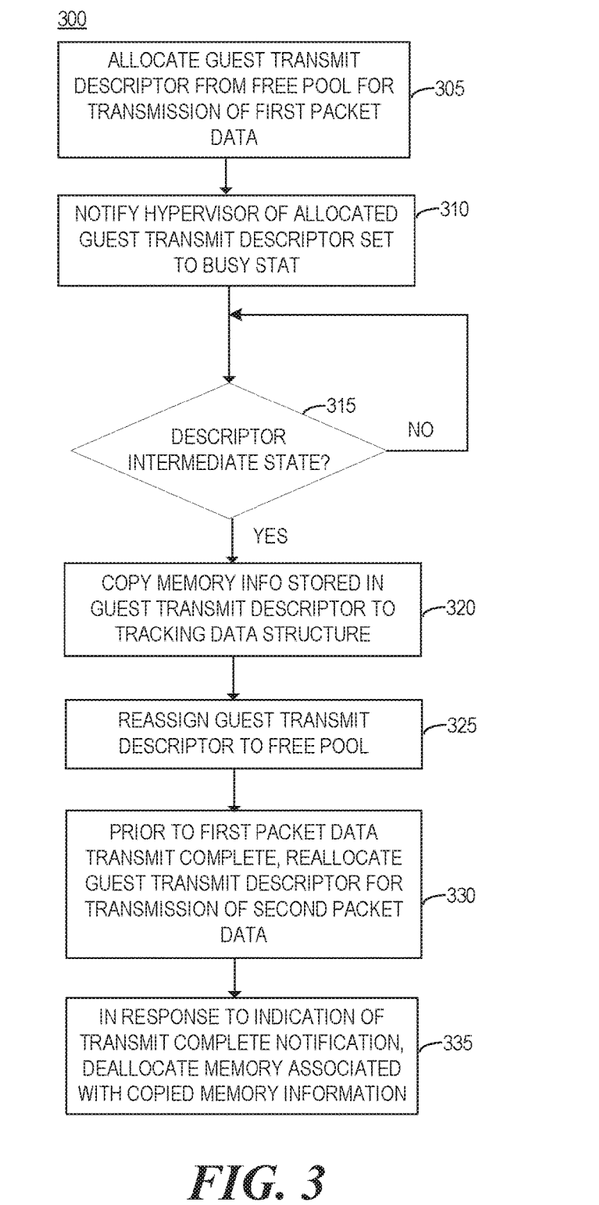
FIG. 3 is a flowchart of an example method of a guest OS virtual network driver of a host computing device including copying memory information from a guest transmit descriptor to a tracking data structure.

FIG. 3 is a flowchart of an example method 300 of a guest OS virtual network driver of a host computing device, including copying memory information from a guest transmit descriptor to a tracking data structure. Although execution of method 300 is described below with reference to host computing device 200 of FIG. 2, other suitable systems for the execution of method 300 may be utilized (e.g., host computing device 100 of FIG. 1). Additionally, implementation of method 300 is not limited to such examples.

In the example of FIG. 3, method 300 may be performed by a guest OS virtual network driver of a guest OS of a host computing device 200. For example, instructions 223 of FIG. 2 (including instructions 224-228) may implement a guest OS virtual network driver to perform method 300 when executed by at least one processing resource 210. In such examples, at 305 of method 300, instructions 224 may allocate, for transmission of first data, a given guest transmit descriptor from a free pool of a circular list of a predetermined number of guest transmit descriptors of the guest OS. The allocation may include instructions 224 assigning a busy state to the given guest transmit descriptor, as described above.

At 310, instructions 225 may notify a hypervisor associated with the guest OS of the given guest transmit descriptor allocated and assigned the busy state, as described above. The hypervisor may be a hypervisor to manage the execution of the guest OS and may be executed on the host computing device 200. At 315, instructions 226 may determine whether the given guest transmit descriptor is assigned an intermediate state different than the busy state. For example, as described above, the hypervisor may change the state assigned to the given guest transmit descriptor to the intermediate state after being notified of the given guest transmit descriptor. In response to determining that the given guest transmit descriptor is assigned an intermediate state (different than the busy state), instructions 227 may copy memory information stored in the given guest transmit descriptor to a tracking data structure of the guest OS (at 320) and assign the given guest transmit descriptor back to the free pool (at 325), as described above.

At 330, instructions 224 may reallocate the given guest transmit descriptor from the free pool for transmission of second data, prior to any indication that a transmit complete notification has been provided for the first data. At 335, in response to an indication that a transmit complete notification has been provided for the first data, instructions 228 may deallocate memory referenced by the memory information copied from the given guest transmit descriptor to the tracking data structure, as described above.

Although the flowchart of FIG. 3 shows a specific order of performance of certain functionalities, method 300 is not limited to that order. For example, the functionalities shown in succession in the flowchart may be performed in a different order, may be executed concurrently or with partial concurrence, or a combination thereof. In some examples, functionalities described herein in relation to FIG. 3 may be provided in combination with functionalities described herein in relation to any of FIGS. 1-2 and 4.

Figure 4:
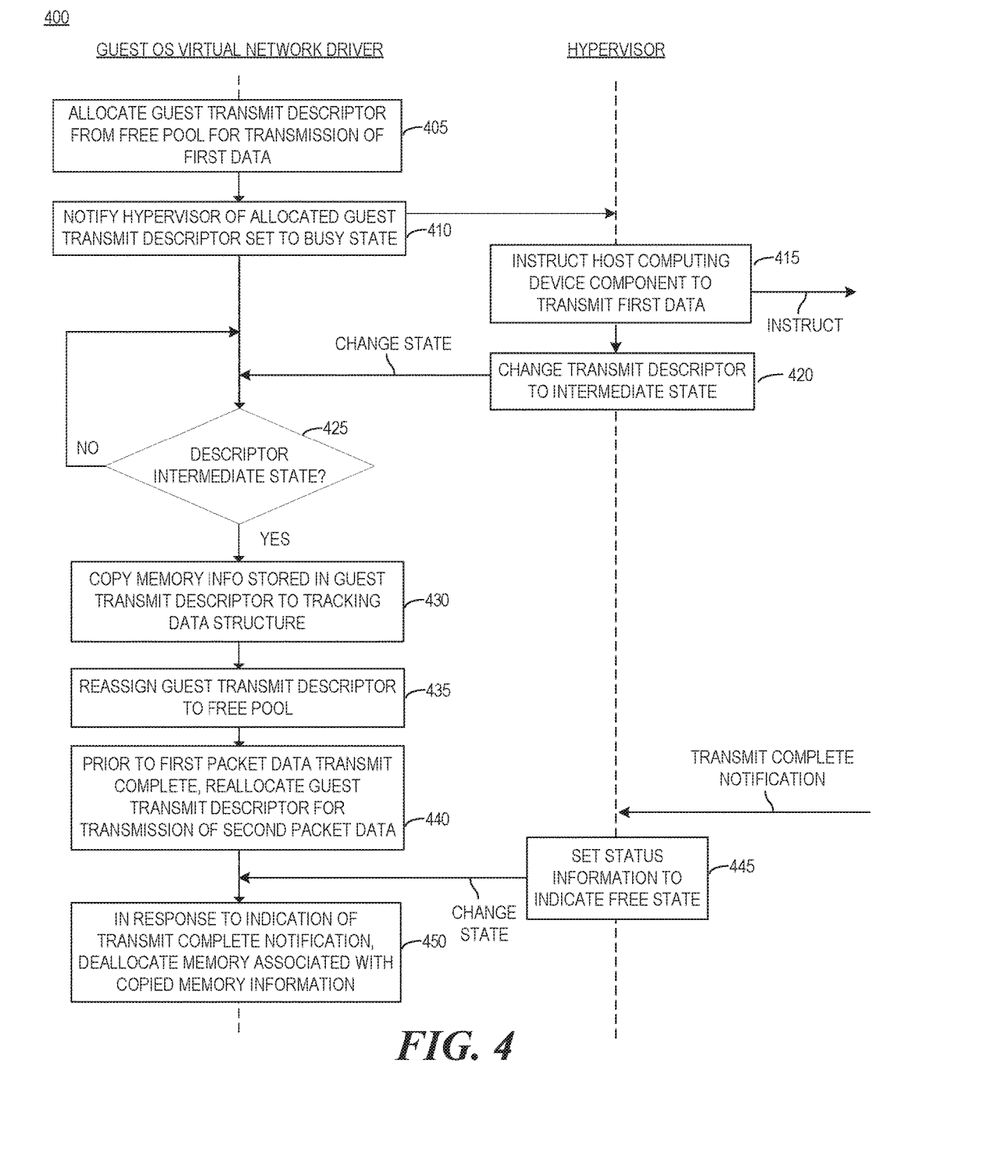
FIG. 4 is a flowchart of an example method of a host computing device including changing the state of a guest transmit descriptor to an intermediate state.

FIG. 4 is a flowchart of an example method 400 of a host computing device including changing the state of a guest transmit descriptor to an intermediate state. In the example of FIG. 4, method 400 may be performed by a host computing device 100, including instructions 123 to implement a guest OS virtual network driver of a guest OS 190 of host computing device 100, and instructions 170 to implement a hypervisor 172 of host computing device 100, wherein the hypervisor 172 is to manage the guest OS 190. In such examples, instructions 123 and 170 may be executed by at least one processing resource 110 to implement method 400. Although execution of method 400 is described below with reference to host computing device 100 of FIG. 1, other suitable systems for the execution of method 400 may be utilized (e.g., host computing device 200 of FIG. 2). Additionally, implementation of method 400 is not limited to such examples. For clarity of explanation, in FIG. 4, functionalities that may be implemented by a guest OS virtual network driver (e.g., via execution of instructions 123) are illustrated on the left side of the page under the "guest OS virtual network driver" heading, and functionalities that may be implemented by a hypervisor (e.g., via execution of instructions 170) are illustrated on the right side of the page under the "hypervisor" heading.

In some examples, at 405 of method 400, instructions 123 may allocate, for transmission of first data 163, a given guest transmit descriptor 132 from a free pool of a circular list of a predetermined number of guest transmit descriptors of the guest OS (i.e., guest transmit descriptor ring 130). Instructions 123 may assign a busy state 165 to the given guest transmit descriptor 132, as described above, as part of the allocation. At 410, instructions 123 may notify a hypervisor 172 associated with the guest OS of the given guest transmit descriptor 132 allocated and assigned the busy state 165, as described above.

At 415, in response to notification of the given guest transmit descriptor 132 allocated and assigned the busy state 165, instructions 170 (i.e., hypervisor 172) may instruct a component of host computing device 100 to transmit the first data 163 to a destination, wherein the guest transmit descriptor is associated with the first data 163. For example, instructions 170 may provide the first data 163 to a driver of physical network interface 105 of host computing device 100 (or post the first data 163 to the physical network interface). At 420, after the instruction of the host computing device component and before receiving a transmit complete notification for the first data 163, instructions 170 may change the state of the given guest transmit descriptor to an intermediate state 166, as described above in relation to FIG. 1.

At 425, instructions 123 (i.e., the guest OS virtual network driver) may determine whether the given guest transmit descriptor 163 is assigned an intermediate state different than the busy state. For example, as described above, hypervisor 172 may change the state assigned to the given guest transmit descriptor to the intermediate state 166 after being notified of the given guest transmit descriptor 132. In response to determining that the given guest transmit descriptor 132 is assigned an intermediate state 166 (different than the busy state 165), instructions 123 may copy memory information stored in the given guest transmit descriptor 132 to a tracking data structure 150 of the guest OS (at 430) and assign the given guest transmit descriptor 132 back to the free pool (at 435), as described above. In some examples the memory information copied may include a copied data pointer 153 pointing to a memory location 162 at which the first data 163 is stored, and a copied status pointer 154 pointing to a memory location 164 at which state information is stored.

At 440, instructions 123 may reallocate the given guest transmit descriptor 132 from the free pool for transmission of second data, prior to any indication that a transmit complete notification has been provided for the first data 163. At 445, in response to receiving a transmit complete notification for the first data 163, instructions 170 (i.e., hypervisor 172) may set status information (referenced by the memory information 154 copied from the given guest transmit descriptor to the tracking data structure) to indicate a free state 167. As described above, the change of the state to a free state 167 in the status information stored at memory location 164 may indicate to instructions 123 that the transmit complete notification for first data 163 has been provided to hypervisor 172. In such examples, at 450, instructions 123 (i.e., the guest OS virtual network driver) may deallocate memory referenced by the memory information copied from the given guest transmit descriptor to the tracking data structure, as described above, in response to the indication that a transmit complete notification has been provided for the first data 163 (i.e., in response to the free state being stored in the status information). As described above, in some examples the memory information may include a copied data pointer 153 referencing (i.e., pointing to) memory location 162 including first data 163, and a copied status pointer 154 referencing (i.e., pointing to) memory location 164 including at least an indication of free state 167.

Although the flowchart of FIG. 4 shows a specific order of performance of certain functionalities, method 400 is not limited to that order. For example, the functionalities shown in succession in the flowchart may be performed in a different order, may be executed concurrently or with partial concurrence, or a combination thereof. In some examples, functionalities described herein in relation to FIG. 4 may be provided in combination with functionalities described herein in relation to any of FIGS. 1-3. All of the features disclosed in this specification (including any accompanying claims, abstract and drawings), and/or all of the elements of any method or process so disclosed, may be combined in any combination, except combinations where at least some of such features and/or elements are mutually exclusive.

We claim:

1. An article comprising at least one non-transitory machine-readable storage medium comprising instructions executable by at least one processing resource to execute a guest operating system (OS) virtual network driver to:
    allocate, from a free pool, a guest transmit descriptor of the guest OS for transmission of data by the guest OS virtual network driver via a hypervisor associated with the guest OS, the allocation including assigning a busy state to the guest transmit descriptor;
    notify the hypervisor of the allocated guest transmit descriptor;
    after the notification, determine that the guest transmit descriptor is assigned an intermediate state different than the busy state;
    in response to the determination, copy memory information stored in the guest transmit descriptor to a tracking data structure of the guest OS and assign the guest transmit descriptor back to the free pool; and
    after the assignment of the guest transmit descriptor back to the free pool, and in response to an indication that a transmit complete notification was provided for the data, deallocate memory referenced by the memory information copied from the guest transmit descriptor to the tracking data structure, including memory storing the data.

2. The article of claim 1, wherein:
    the guest transmit descriptor is a given one of a fixed number of guest transmit descriptors of the guest OS and that are maintained in a circular list data structure of the guest OS; and
    the instructions to determine comprise instructions to:
        determine that the given guest transmit descriptor is assigned the intermediate state, after the notification of the hypervisor and prior to any indication that a transmit complete notification has been provided for the data.

3. The article of claim 2, wherein the instructions to allocate comprise instructions to:
   in response to an indication that the data is to be transmitted via the guest OS virtual network driver:
   identify the given guest transmit descriptor from the free pool of the guest transmit descriptors; and
   store memory information in the given guest transmit descriptor, the memory information referencing a first memory location of the host storing the data and referencing a second memory location storing an indication of the busy state for the given guest transmit descriptor.

4. The article of claim 2, wherein the instructions to determine comprise instructions to:
   periodically inspect at least some of the fixed number of guest transmit descriptors to identify any of the guest transmit descriptors that have been assigned to an intermediate state; and
   periodically inspect the tracking data structure to identify any status information referenced by the tracking data structure that indicates a free state;
   wherein the instructions to copy and assign comprise instructions to:
   in response to the determination and prior to any indication that a transmit complete notification was provided for the data, copy memory information stored in the given guest transmit descriptor to a tracking data structure of the guest OS and assign the given guest transmit descriptor back to the free pool.

5. The article of claim 1, wherein the instructions are further executable to:
   after the assignment of the guest transmit descriptor to the free pool and prior to any indication that a transmit complete notification has been provided for the data, reallocate the selected guest transmit descriptor, from the free pool, for transmission of other data;
   wherein the reallocation includes assigning the busy state to the guest transmit descriptor.

6. The article of claim 5, wherein:
   the at least one machine-readable storage medium and the at least one processing resource are part of a host computing device to execute the guest OS virtual network driver and the hypervisor;
   the data is to be transmitted to a computing device remote from the host computing device via a physical network interface of the host computing device; and
   the other data is to be transmitted to a destination local to the host computing device and without use of the physical network interface of the host computing device.

7. The article of claim 1, wherein the at least one non-transitory machine-readable storage medium further comprises instructions executable by the at least one processing resource to execute the hypervisor to:
   in response to notification of the allocated guest transmit descriptor assigned the busy state, instruct the host computing device to transmit the data via the physical network interface, wherein the guest transmit descriptor is associated with the data; and
   after the instruction of the host computing device and before receiving a transmit complete notification for the data, change the state of the guest transmit descriptor to an intermediate state.

8. A host computing device comprising:
   a network interface;
   memory to store instructions to implement a guest operating system (OS) virtual network driver and a hypervisor; and
   at least one processing resource to execute the instructions;
   wherein the hypervisor instructions are executable to:
   based on a given guest transmit descriptor of the guest OS that is assigned a busy state and associated with data for transmission, instruct the host computing device to transmit the data via the network interface; and
   after the instruction and before receiving a transmit complete notification for the data, change the state of the given guest transmit descriptor to an intermediate state; and
   wherein the guest OS virtual network driver instructions are executable to:
   in response to a determination that the given guest transmit descriptor is assigned the intermediate state:
   copy memory information from the given guest transmit descriptor to a tracking data structure of the guest OS; and
   assign the given guest transmit descriptor to a free pool of guest transmit descriptors for the guest OS; and
   after the assignment to the free pool and in response to an indication that a transmit complete notification was provided for the data, deallocate memory referenced by the memory information copied from the given guest transmit descriptor to the tracking data structure.

9. The host computing device of claim 8, wherein the guest OS virtual network driver instructions are further executable to:
   after the assignment to the free pool and prior to any indication that a transmit complete notification has been provided for the data, reallocate the given guest transmit descriptor, from the free pool, for transmission of other data;
   wherein the reallocation includes assigning the busy state to the given guest transmit descriptor.

10. The host computing device of claim 8, wherein:
    the hypervisor instructions are further executable to:
    in response to receiving a transmit complete notification for the data, set status information to indicate a free state, wherein the status information is referenced by the memory information copied from the given guest transmit descriptor to the tracking data structure; and
    the guest OS virtual network driver instructions to deallocate comprise instructions to:
    after the assignment to the free pool and in response to identifying that the status information is set to indicate the free state, deallocate the memory referenced by the memory information copied from the given guest transmit descriptor to the tracking data structure, including memory storing the data for transmission.

11. The host computing device of claim 8, wherein the guest OS virtual network driver instructions are further executable to, prior to the hypervisor instructing the host computing device to transmit the data:
    allocate, for transmission of the data, the given guest transmit descriptor from the free pool of guest transmit descriptors, the allocation including assigning a busy state to the guest transmit descriptor and associating the data with the given guest transmit descriptor.

12. The host computing device of claim 8, wherein:
the memory information of the given guest transmit descriptor comprises:
  a pointer to a first memory location including the data for transmission; and
  a pointer to a second memory location to store status information, including any state assigned to the given guest transmit descriptor;
the given guest transmit descriptor further comprises memory mapping information;
the instructions to deallocate include instructions further to, in response to the indication that the transmit complete notification was provided for the data, deallocate the memory storing the memory mapping information copied from the guest transmit descriptor to the tracking data structure.

13. A method of a host computing device comprising:
with a guest operating system (OS) virtual network driver of a guest OS of the host computing device:
  allocating, for transmission of first data, a given guest transmit descriptor from a free pool of a circular list of a predetermined number of guest transmit descriptors of the guest OS, the allocating including assigning a busy state to the given guest transmit descriptor;
  notifying a hypervisor associated with the guest OS of the given guest transmit descriptor allocated and assigned the busy state;
  in response to determining that the given guest transmit descriptor is assigned an intermediate state different than the busy state:
    copying memory information stored in the given guest transmit descriptor to a tracking data structure of the guest OS; and
    assigning the given guest transmit descriptor back to the free pool; and
  from the free pool, reallocating the given guest transmit descriptor for transmission of second data, prior to any indication that a transmit complete notification has been provided for the first data; and
  in response to an indication that a transmit complete notification has been provided for the first data, deallocating memory referenced by the memory information copied from the given guest transmit descriptor to the tracking data structure.

14. The method of claim 13, further comprising:
with the hypervisor of the host computing device:
  in response to notification of the given guest transmit descriptor allocated and assigned the busy state, instructing a component of the host computing device to transmit the first data to a destination, wherein the guest transmit descriptor is associated with the first data; and
  after the instruction of the host computing device component and before receiving a transmit complete notification for the first data, changing the state of the given guest transmit descriptor to an intermediate state.

15. The method of claim 14, further comprising:
with the hypervisor of the host computing device:
  in response to receiving a transmit complete notification for the first data, set status information to indicate a free state, wherein the status information is referenced by the memory information copied from the given guest transmit descriptor to the tracking data structure.

* * * * *